T. W. McGRATH.
GATE.
APPLICATION FILED JULY 14, 1916.
1,222,223.
Patented Apr. 10, 1917.
2 SHEETS—SHEET 1.
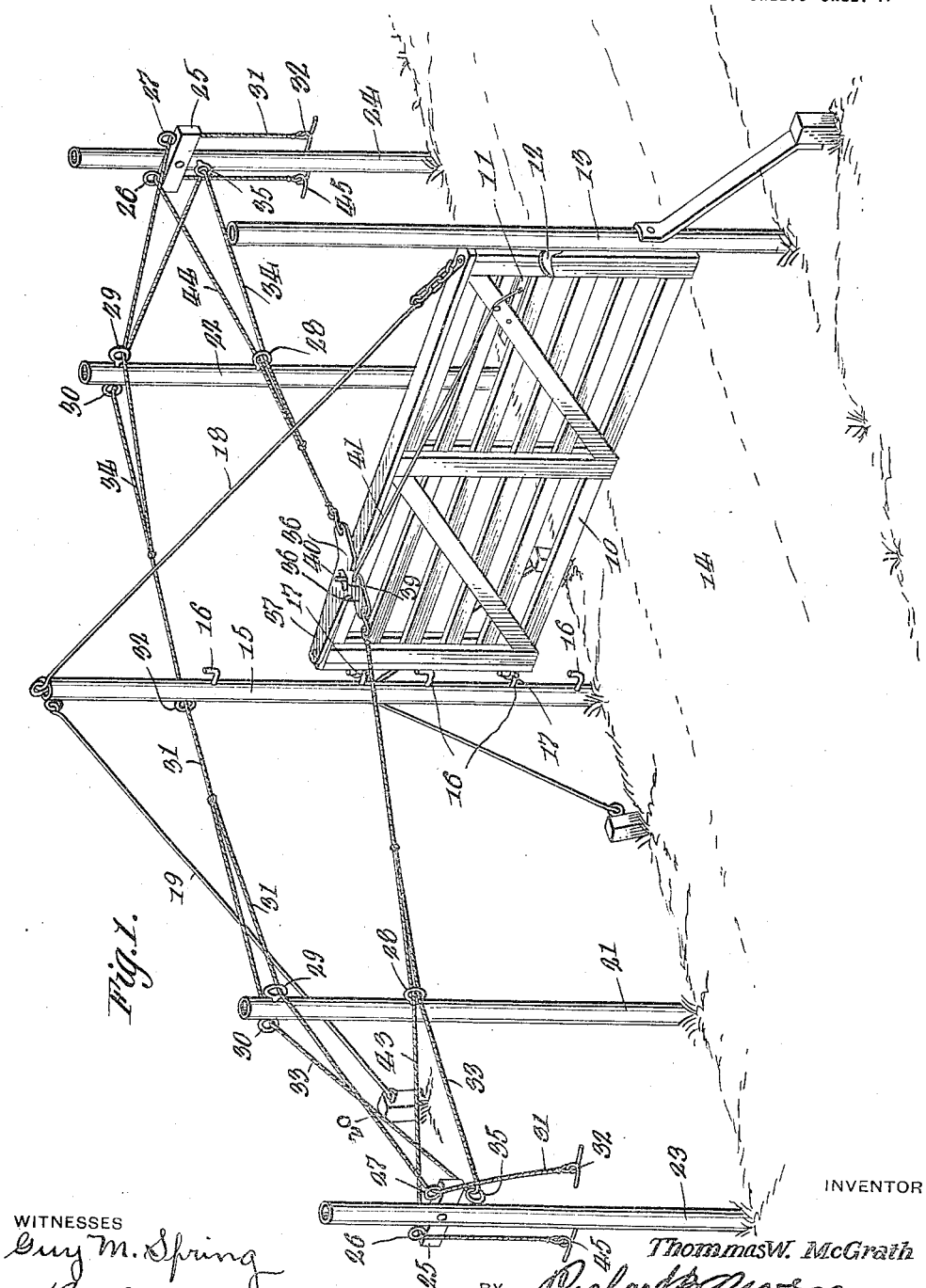
WITNESSES
INVENTOR
Thomas W. McGrath
BY
ATTORNEY T. W. McGRATH.
GATE.
APPLICATION FILED JULY 14, 1916.
1,222,223.
Patented Apr. 10, 1917.
2 SHEETS—SHEET 2.
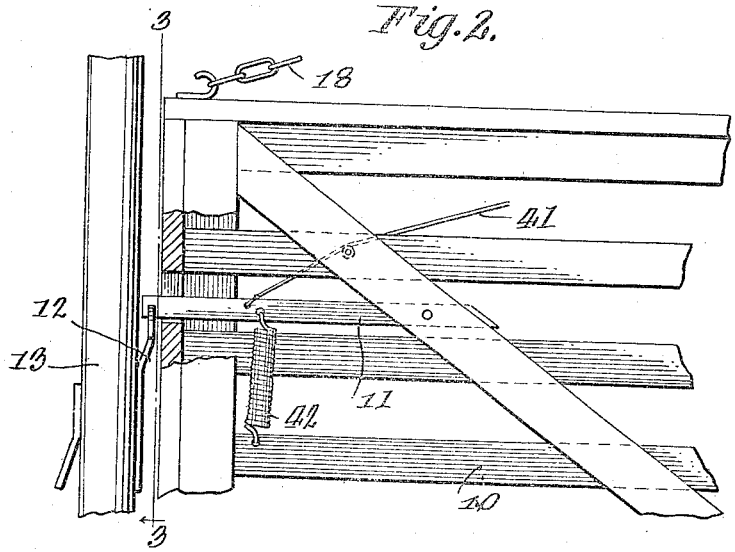
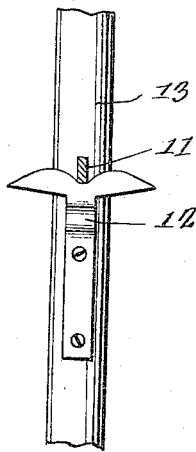
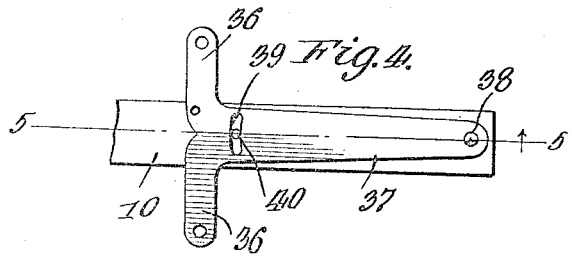
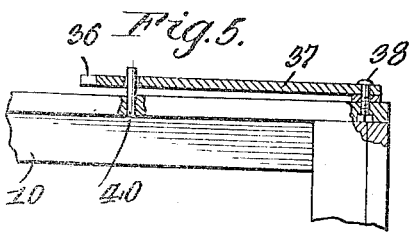
INVENTOR
*Thommas W. McGrath*
WITNESSES
BY
ATTORNEY

UNITED STATES PATENT OFFICE.

THOMMAS W. McGRATH, OF SILVERTON, OREGON.

GATE.

1,222,223.   Specification of Letters Patent.   Patented Apr. 10, 1917.

Application filed July 14, 1916. Serial No. 109,367.

*To all whom it may concern:*

Be it known that I, THOMMAS W. MC-GRATH, a citizen of the United States, residing at Silverton, in the county of Marion and State of Oregon, have invented certain new and useful Improvements in Gates, of which the following is a specification.

This invention relates to an improved gate and the principal object of the invention is to provide a gate which may be pivotally connected with a post or standard at a desired height and to further provide improved operating means so that the gate may be opened and closed from either side of the gate and further to so construct this operating mechanism that the gate may be opened in either direction desired from either side of the gate.

Another object of the invention is to so construct this operating mechanism that the lines may be connected with the latch of the gate thus raising the latch when swinging the gate open.

This invention is illustrated in the accompanying drawings, wherein:—

Figure 1 is a perspective view of the improved gate and operating mechanism.

Fig. 2 is a view in elevation of a fragment of the gate showing the latch.

Fig. 3 is a view taken along the line 3—3 of Fig. 2 and looking toward the post.

Fig. 4 is a top plan view of the plate with which the latch operating line and gate opening and closing lines are connected.

Fig. 5 is a sectional view taken along the line 5—5 of Fig. 4.

The gate is indicated in general by the numeral 10 and is provided with a latch bar 11 which is pivotally mounted adjacent its inner end and has its outer end extending beyond the end of the gate so that it may engage the socket bracket 12 carried by the post 13. This post 13 is mounted upon the opposite side of the road way 14 from the post or standard 15 and the gate will be pivotally connected with the post 15 by means of hooks 16, a selected pair of which will pass through the eyes 17 of the gate. Therefore the gate may be pivotally mounted at any height desired so that small animals can pass beneath the gate whereas large animals will be prevented from passing from one field to another. It should be further noted that the free end of the gate is connected with the supporting or truck 18 which will prevent sagging of the gate or strain upon the hinges, the post 15 being in its turn braced by means of the truck rod 19 leading from the upper end of the post and connected with the base 20.

Upon opposite sides of the gate, and along the roadway, there is positioned posts 21 and 22 and 23 and 24, the posts 23 and 24 carrying cross arms 25. These cross arms 25 carry eyes 26 and 27 and the posts 21 and 22 each carries a lower eye 28 and upper eyes 29 and 30. A line 31 passes through the eye 32 of post 15 and through the eyes 29 of the posts 21 and 22 and is then passed through the eyes 27 of the posts 23 and 24. Hand-holds 32 are provided upon the ends of this line to permit it to be easily grasped and to further prevent the ends from slipping through the eyes 27. Branch lines 33 and 34 are connected with the line 31 upon opposite sides of the post 15 and are passed through the eyes 30 of the posts 21 and 22 and after being passed through these eyes 35 of the posts 23 and 24 are passed through the eyes 28 of the posts 21 and 22 and connected with the arms 36 of the plate 37. This plate 37 is pivotally connected with the gate by means of the bolt or other fastener 38 and is provided with a slot 39 through which passes the pin 40. It will be seen that when the plate is moved in one direction, it will engage the pin and swing the gate in that direction. It will be further seen that the slot is of such length that the initial movement of the lever arm will draw the line 41 to raise the latch out of engagement with the socket bracket 12 thus releasing the gate and that upon further movement of the lever arm, the gate will be moved. Spring 42 is provided to yieldably hold the latch in the lowered position and thus permitting the gate to be securely but releasably held in the closed position. In order to permit the gate to be moved in an opposite direction from which it will be moved when one end of the line 31 is drawn there has been provided lines 43 and 44 which are connected with the lines 33 and 34 at points intermediate the plates 37 and the eyes 28 and are passed through these eyes 28 and through the eyes 26 of the posts 23 and 24, the free ends of the lines 43 and 44 carrying hand-holds 45 so that the lines may be easily drawn to move the gate and further serving to prevent the lines from being drawn out of the eyes 26.

When in use the gate will be presumed to be closed and a person approaches the gate from the left in Fig. 1. If it is desired to open the gate so that the gate will swing away from the person or toward the right in Fig. 1, the line 31 will be drawn upon and this will swing the plate 37 to release the latch and swing the gate toward the right in the figures or away from the person. After passing through the gate, the opposite end of the line 31 will be grasped and the gate can then be swung backwardly into a closed position. If it is desired to swing the gate toward the left in Fig. 1, in order to open it, the line 43 will be drawn upon and this will swing the plate 37 toward the left thus swinging the gate open. After passing through, the line 44 will be drawn upon and the gate will be swung closed. It will thus be seen that the gate may be opened in either direction and closed after the person has passed through the gate and further that it may be swung either toward the person approaching the gate or in an opposite direction according to the wishes of the operator.

What is claimed is:—

A gate and actuating mechanism comprising a gate carrying post, a gate pivotally connected with said gate carrying post, a latch movably connected with said gate to releasably hold the gate in a closed position, a lever arm pivotally connected with said gate and having a transversely extending slot, a pin extending from the gate through the slot to limit the swinging movement of the lever arm, flexible means leading from said lever to said latch for moving the latch to a releasing position, supporting posts positioned upon opposite sides of said gate carrying post, and actuating lines carried by said gate carrying post and supporting posts and connected with said lever for moving the latch and then swinging the gate.

In testimony whereof I affix my signature in presence of two witnesses.

THOMMAS W. McGRATH.

Witnesses:
DELLA McGRATH,
J. J. TALLMAN.

Copies of this patent may be obtained for five cents each, by addressing the "Commissioner of Patents, Washington, D. C."